United States Patent [19]

Olstowski

[11] 4,125,487

[45] Nov. 14, 1978

[54] NON-CELLULAR AND CELLULAR COMPOSITES OF POLYURETHANES AND VINYL POLYMERS

[75] Inventor: Franciszek Olstowski, Freeport, Tex.

[73] Assignee: The Dow Chemical Company, Midland, Mich.

[21] Appl. No.: 799,421

[22] Filed: May 23, 1977

[51] Int. Cl.$^2$ .................... C08G 18/22; C08G 18/62
[52] U.S. Cl. ................................ 521/137; 521/123; 521/124; 521/174; 521/176; 521/131; 260/859 R; 528/56; 528/75; 528/48; 260/30.2; 260/30.4 R; 260/30.6 R; 260/31.2 R; 260/31.4 R
[58] Field of Search .................. 260/2.5 BE, 2.5 AB, 260/859 PV, 859 R, 77.5 AB

[56] References Cited

U.S. PATENT DOCUMENTS

| | | | |
|---|---|---|---|
| 3,700,752 | 10/1972 | Hutchinson | 260/859 R |
| 3,753,933 | 8/1973 | Olstowski et al. | 260/2.5 AE |
| 3,763,065 | 10/1973 | Herrmann | 260/22 TN |
| 3,773,697 | 11/1973 | Olstowski | 260/28 |
| 3,859,381 | 1/1975 | Hutchinson | 260/859 R |
| 3,868,431 | 2/1975 | Hutchinson | 260/859 R |
| 3,876,728 | 4/1975 | Kuroda et al. | 260/23 TN |
| 3,886,229 | 5/1975 | Hutchinson et al. | 260/859 R |
| 3,933,728 | 1/1976 | Henbest | 260/37 N |
| 3,968,089 | 7/1976 | Cuscurida et al. | 260/859 R |

FOREIGN PATENT DOCUMENTS

| | | | |
|---|---|---|---|
| 1,308,637 | 2/1973 | United Kingdom | 260/859 R |
| 1,367,330 | 9/1974 | United Kingdom. | |
| 1,373,182 | 11/1974 | United Kingdom. | |

OTHER PUBLICATIONS

Allen et al., Polymer, vol. 14, Dec. 1973, pp. 597-616.
Frisch et al., J. of Polymer Science: (Polymer Chemistry Ed.), vol. 12, pp. 885-896 (1974).
Kircher et al., Plastics Engineering, Oct. 1976, pp. 37-39.

*Primary Examiner*—H.S. Cockerham
*Attorney, Agent, or Firm*—J. G. Carter

[57] ABSTRACT

Polyurethane/vinyl polymer composites are prepared without the requirement of the application of an external source of heat by the admixture of a composition comprising
 (A) a polyether polyol having an equivalent weight of 30-2500, such as an adduct of glycerine with propylene oxide;
 (B) an organic polyisocyanate, such as toluene diisocyanate;
 (C) an ethylenically unsaturated monomer, such as styrene;
 (D) a catalyst for polymerizing ethylenically unsaturated monomers such as tertiary butyl perbenzoate; and
 (E) a catalyst for urethane formation such as cobalt naphthenate.

Foams may also be prepared by adding an appropriate foaming agent.

56 Claims, No Drawings

NON-CELLULAR AND CELLULAR COMPOSITES OF POLYURETHANES AND VINYL POLYMERS

This invention relates to polyurethane/vinyl polymer composite articles and to a process for their preparation.

U.S. Pat. No. 3,700,752 discloses a two-step process of completely gelling the polyurethane before allowing the vinyl monomer to polymerize in the preparation of shaped polymeric articles. This patent also states that it has been proposed to produce shaped articles from a composition comprising a vinyl monomer and the precursors of a crosslinked polyurethane by simultaneously polymerizing the vinyl monomer and gelling the crosslinked polyurethane. However, it has not been disclosed as to how to accomplish this without the addition of an outside heat source.

U.S. Pat. No. 3,876,728 discloses room temperature curing polyurethane/vinyl polymer composites when unsaturated polyesters are employed but with unsaturated monomers heating is required to accomplish polymerization of the vinyl monomer.

By contrast, the present invention describes a process wherein the urethane and vinyl polymerization occurs essentially simultaneously without the requirement of an external heat source.

The compositions described in this application are well suited to the production of cellular or non-cellular (elongation greater than 100%) articles such as, for example, furniture components, ornamental or decorative objects, piping elements, machine components, or structural members from a limited number of molds.

The composites of the present invention are also suitable for use as cast or shaped members to serve as automotive bumpers, marine fenders, or general impact surfaces. These are also useful as automotive protective strips or wheel covers. Further applications include flexible molding, useful in general carpentry or cabinet making. A spray or brush application of these formulations are also useful as tough flexible protective coatings on metal, wood, plastic or concrete surfaces.

These compositions also afford local energy conservation since it is not necessary to preheat the reactants nor expose the resin products to thermal curing cycles, although in some instances this may be desirable.

It has now been discovered that articles of polyurethane/vinyl polymer composites can be prepared essentially simultaneously without the necessity of the use of an external source of heat.

The term "vinyl monomer" employed herein means a polymerizable, ethylenically unsaturated monomer excluding unsaturated polyester resins.

The term "vinyl polymer" as employed herein means a polymer prepared from one or more of such vinyl monomers.

The term "non-cellular" means that the product is not a foam.

The term "cellular" means that the product is a foam, i.e., it contains gas-filled cells of relatively uniform size.

The term "free of nitrogen atoms" means that the polyol does not have any nitrogen atoms within the chemical structure of the polyol.

The term "non-elastomeric" means that the product has an elongation value of less than about 100%.

The term "elastomeric" means that the product has an elongation value of at least about 100%.

The term urethane/vinyl polymer composite means that the product is a mixture of two substantially independent polymer systems, one being a polyurethane, the other being a vinyl polymer, which are incapable of separation by physical means.

The process of the present invention for preparing non-cellular polyurethane/vinyl polymer composite articles having a density of at least about 1 g/cc without the application of an external source of heat, comprises:

(I) admixing the components of a composition comprising
   (A) a liquid polyol which is free of nitrogen atoms, or mixtures of such polyols, preferably essentially free from ethylenic unsaturation, having from about 2 to about 8 hydroxyl groups and an average OH equivalent weight of at least about 30 usually from about 30 to about 2500, and preferably from about 50 to about 1000;
   (B) an organic polyisocyanate, preferably essentially free from ethylenic unsaturation, having an NCO equivalent weight of less than about 1000, preferably less than about 750, with the proviso that when component (A) has an average of about 2 hydroxyl groups per molecule, said polyisocyanate has an average of at least about 2.5 NCO groups per molecule;
   (C) from about 15% to less than about 75% preferably from about 20% to about 60% by weight of the combined weight of Components (A), (B), (C), (D), and (E) of a polymerizable ethylenically unsaturated monomer, preferably free from groups reactive with components (A) or (B), having an atmospheric boiling point above about 70° C preferably above about 100° C of a mixture of such monomers;
   (D) an effective quantity of a suitable catalyst for polymerizing component (C);
   (E) an effective quantity of a suitable catalyst for urethane formation selected from compounds of the metals cobalt, copper and vanadium; and
   (F) from 0 to about 50% by weight based upon the combined weight of components (A), (B), (C), (D), (E) and (F) of a modifier substance free from groups reactive with components (A), (B) or (C) at the conditions employed herein, said modifier substances being selected from the group consisting of
      (1) liquid substances having an atmospheric boiling point of at least about 150° C;
      (2) solid substances having a surface area of less than about 0.8 m$^2$/gram and a particle size such that said substance will pass through a one-fourth inch square opening, is substantially free of any absorbed or occluded water and will not decompose at a temperature below the maximum exotherm temperature generated by the urethane forming reaction;
      (3) polymers of one or more ethylenically unsaturated monomers, said polymers having
         (a) a molecular weight such that the polymer has a grease melt index as determined with a 0.02-inch orifice employing a total weight of 2160 grams at 80° C of from about 1 to about 250 grams/minute, preferably from about 75 to about 200 grams/minute;
         (b) a solubility parameter of at least about 8 and preferably from about 8 to about 12.5;
         (c) and a specific heat of at least about 0.35 calories/gram/° C; and (4) mixtures thereof; and wherein components (A) and (B) are present in quantities such that the NCO:OH equivalent ratio is from about 0.70:1 to about 1.5:1 preferably from about 0.90:1 to about 1.2:1 and with the following provisos:
  (a) that the urethane exotherm temperature does not greatly exceed the boiling point of the monomer or mixtures of monomers employed as component (C);
  (b) that the combined quantity of component (C) and (F) be less than about 60% by weight based upon the combined weight of components (A), (B), (C) and (F);
  (c) that when Component (F-3) is employed as component (F), it is employed in quantities of ≦20% by weight of the combined quantities of components (A), (B) and (F);

(II) pouring the admixed composition into a suitable mold wherein said composition solidifies to a solid having the aforesaid density; and (III) subsequently demolding the resultant articles from the mold.

The present invention also pertains to non-cellular polyurethane/vinyl polymer composite articles having a density of at least about 1 g/cc which results from the admixture without the application of an external source of heat of a composition which comprises:

(A) a liquid polyol free of nitrogen atoms, or mixture of such polyols, preferably essentially free from ethylenic unsaturation, having from about 2 to about 8 hydroxyl groups and an average OH equivalent weight of at least about 30, usually from about 30 to about 2500, and preferably from about 50 to about 1000;

(B) an organic polyisocyanate, preferably essentially free from ethylenic unsaturation, having an NCO equivalent weight of less than about 1000, preferably less than about 750, with the proviso that when component (A) has an average of about 2 hydroxyl groups per molecule, said polyisocyanate has an average of at least about 2.5 NCO groups per molecule;

(C) from about 15% to less than about 75% preferably from about 20% to about 60% by weight of the combined weight of Components (A), (B), (C), (D) and (E) of a polymerizable ethylenically unsaturated monomer, preferably free from groups reactive with components (A) or (B), having an atmospheric boiling point above about 70° C, preferably above about 100° C or a mixture of such monomers;

(D) an effective quantity of a suitable catalyst for polymerizing component (C);

(E) an effective quantity of a suitable catalyst for urethane formation selected from compounds of the metals cobalt, copper and vanadium; and (F) from 0 to about 50% by weight based upon the combined weight of components (A), (B), (C), (D), (E) and (F) of a modifier substance free from groups reactive with components (A), (B) or (C) at the conditions employed herein, said modifier substances being selected from the group consisting of
  (1) liquid substances having an atmospheric boiling point of at least about 150° C;
  (2) solid substances having a surface area of less than about 0.8 m²/gram and a particle size such that said substance will pass through a one-fourth inch square opening, is substantially free of any absorbed or occluded water and will not decompose at a temperature below the maximum exotherm temperature generated by the urethane forming reaction;
  (3) polymers of one or more ethylenically unsaturated monomers, said polymers having
    (a) a molecular weight such that the polymer has a grease melt index as determined with a 0.02-inch orifice employing a total weight of 2160 grams at 80° C, of from about 1 to about 250 grams/minute, preferably from about 75 to about 200 grams/minute;
    (b) a solubility parameter of at least about 8 and preferably from about 8 to about 12.5;
    (c) and a specific heat of at least about 0.35 calories/gram/°C; and
  (4) mixtures thereof; and wherein components (A) and (B) are present in quantities such that the NCO:OH equivalent ratio is from about 0.75:1 to about 1.5:1 and with the following provisos:
    (a) that the urethane exotherm temperature does not greatly exceed the boiling point of the monomer employed as component (C);
    (b) that the combined quantity of components (C) and (F) be less than about 65% by weight based upon the combined weight of components (A), (B), (C) and (F);
    (c) that when component (F-3) is employed as component (F), it is employed in quantities of about ≦20% by weight based upon the combined quantities of components (A), (B) and (F).

The present invention still further pertains to cellular polyurethane/vinyl polymer composite articles having substantially uniform cells, a density of less than 1 g/cc, preferably from about 0.025 to about 0.8 g/cc, and which results without the application of an external source of heat after admixture of a composition which comprises (A) a liquid polyol free of nitrogen, atoms, or mixture of such polyols, preferably essentially free from ethylenic unsaturation, having from about 2 to about 8 hydroxyl groups and an average OH equivalent weight of at least about 30, usually from about 30 to about 300, and preferably from about 50 to about 250;

(B) an organic polyisocyanate, preferably essentially free from ethylenic unsaturation, having an NCO equivalent weight of less than about 300, preferably less than about 250, with the proviso that when component (A) has an average of about 2 hydroxyl groups per molecule, said polyisocyanate has an average of at least about 2.5 NCO groups per molecule;

(C) from about 15% to less than about 75% preferably from about 20% to about 60% by weight of the combined weight of Components (A), (B), (C), (D) and (E) of a polymerizable ethylenically unsaturated monomer, preferably free from groups reactive with components (A) or (B), having an atmospheric boiling point above about 70° C, preferably above about 100° C or a mixture of such monomers;

(D) an effective quantity of a suitable catalyst for polymerizing component (C);

(E) an effective quantity of a suitable catalyst for urethane formation selected from compounds of the metals cobalt, copper and vanadium; and
(F) from 0 to about 50% by weight based upon the combined weight of components (A), (B), (C), (D), (E) or (F) of a modifier substance free from groups reactive with Components (A), (B) or (C) at the conditions employed herein, said modifier substances being selected from the group consisting of
  (1) liquid substances having an atmospheric boiling point of at least about 150° C;
  (2) solid substances having a surface area of less than about 0.8 m²/gram and a particle size such that said substance will pass through a one-fourth inch square opening, is substantially free of any absorbed or occluded water and will not decompose at a temperature below the maximum exotherm temperature generated by the urethane forming reaction;
  (3) polymers of one or more ethylenically unsaturated monomers, said polymers having
    (a) a molecular weight such that the polymer has a great melt index as determined with a 0.02-inch orifice employing a total weight of 2160 grams at 80° C of from about 1 to about 250 grams/minute, preferably from about 75 to about 200 grams/minute;
    (b) a solubility parameter of at least about 8 and preferably from about 8 to about 12.5;
    (c) and a specific heat of at least about 0.35 calories/gram/° C; and
  (4) mixtures thereof; and
(G) a foam-forming system which comprises
  (1) a foaming agent selected from the group consisting of
    (a) low boiling vaporizable organic liquids having a boiling point below the reaction exotherm temperature;
    (b) substances which decompose thermally to release $CO_2$ or release water vapor at the exotherm temperature;
    (c) a solid particulate substance which will pass through a 2 mm, preferably 1 mm square opening and which has a surface area of at least 0.8 m²/gram, preferably at least about 1 m²/gram;
    (d) an inorganic metal hydrate characterized as having a solubility in anhydrous ethyl alcohol of less than about 1.2 grams per 100 grams and a weight loss of at least 5%; preferably at least about 8% when subjected to a temperature of 115° C for 30 minutes at atmospheric pressure;
    (e) water;
    (f) mixtures thereof; and
  (2) a cell control agent; and
wherein components (A) and (B) are present in quantities such that the NCO:OH equivalent ratio is from about 0.7:1 to about 1.5:1; preferably from about 0.9:1 to about 1.2:1, component (G-1) is present in quantities sufficient to provide the desired density and component (G-2) is present in quantities sufficient to provide substantially uniform cells; and with the following provisos:
  (a) that the urethane exotherm temperature does not greatly exceed the boiling point of the monomer or mixture of monomers employed as component (C);
  (b) that the combined quantity of components (C) and (F) be less than about 60% by weight based upon the combined weight of components (A), (B), (C) and (F);
  (c) that when Component (G-1-c) or (G-1-d) is employed as the blowing agent, component (G-2) is not required;
  (d) that when component (F-3) is employed as component (F) it is employed in quantities of about ≦20% by weight based upon the combined weight of components (A), (B) and (F).

The present invention still further pertains to a process for preparing cellular polyurethane/vinyl polymer composite articles having substatially uniform cells, a density of less than 1 g/cc, preferably from about 0.025 to about 0.7 g/cc, which process comprises:
(I) admixing the components of a composition comprising
  (A) a liquid polyol free of nitrogen atoms, or mixture of such polyols, preferably essentially free from ethylenic unsaturation, having from about 2 to about 8 hydroxyl groups and an average OH equivalent weight of at least about 30, usually from about 30 to about 300, and preferably from about 50 to about 200;
  (B) an organic polyisocyanate, preferably essentially free from ethylenic unsaturation, having an NCO equivalent weight of less than about 300, preferably less than about 250, with the proviso that when component (A) has an average of about 2 hydroxyl groups per molecule, said polyisocyanate has an average of at least about 2.5 NCO groups per molecule;
  (C) from about 15% to less than about 75% preferably from about 20% to about 60% by weight of the combined weight of Components (A), (B), (C), (D) and (E) of a polymerizable ethylenically unsaturated monomer, preferably free from groups reactive with components (A) or (B), having an atmospheric boiling point above about 70° C, preferably above about 100° C or a mixture of such monomers;
  (D) an effective quantity of a suitable catalyst of polymerizing component (C);
  (E) an effective quantity of a suitable catalyst for urethane formation selected from compounds of the metals cobalt, copper and vanadium; and
  (F) from 0 to about 50% by weight based upon the combined weight of components (A), (B), (C), (D), (E) and (F) of a modifier substance free from groups reactive with components (A), (B) or (C) at the conditions employed herein, said modifier substances being selected from the group consisting of
    (1) liquid substances having an atmospheric boiling point of at least about 150° C;
    (2) solid substances having a surface area of less than about 0.8 m²/gram and a particle size such that said substance will pass through a one-fourth inch square opening, is substantially free of any absorbed or occluded water and will not decompose at a temperature below the maximum exotherm temperature generated by the urethane forming reaction;
    (3) polymers of one or more ethylenically unsaturated monomers, said polymers having (a) a molecular weight such that the polymer has a grease melt index as determined with a 0.02-inch orifice employing a total weight of 2160 grams at 80° C of from about 1 to about 250 grams/minute, preferably from about 75 to about 200 grams/minute;
(b) a solubility parameter of at least about 8 and preferably from about 8 to about 12.5;
(c) and a specific heat of at least about 0.35 calories/gram° C; and
(4) mixtures thereof; and
(G) a foam-forming system which comprises
(1) a forming agent selected from the group consisting of
(a) low boiling vaporizable organic liquids having a boiling point below the reaction exotherm temperature;
(b) substances which decompose thermally to release $CO_2$ or release water vapor at the exotherm temperature;
(c) a solid particulate substance which will pass through a 2 mm, preferably 1 mm square opening and which has a surface area of at least 0.8 m²/gram, preferably at least about 1 m²gram;
(d) an inorganic metal hydrate characterized as having a solubility in anhydrous ethyl alcohol of less than about 1.2 grams per 100 grams and a weight loss of at least 5%; preferably at least about 8% when subjected to a temperature of 115° C for 30 minutes at atmospheric pressure;
(e) water;
(f) mixtures thereof; and
(2) a cell control agent; and wherein components (A) and (B) are present in quantities such that the NCO:OH equivalent ratio is from about 0.75:1 to about 1.5:1, component (G-1) is present in quantities sufficient to provide the desired density and component (G-2) is present in quantities sufficient to provide substantially uniform cells; and with the following provisos:
(a) that the urethane exotherm temperature does not greatly exceed the boiling point of the monomer or mixture of monomers employed as component (C);
(b) that the combined quantity of components (C) and (F) be less than about 60% by weight based upon the combined weight of components (A), (B), (C) and (F);
(c) that when component (G-1-c) or (G-1-d) is employed as the blowing agent, component (G-2) is not required;
(d) that when component (F-3) is employed as the modifier component, it is employed in quantities of $\leq 20\%$ by weight of the combined weight of components (A), (B) and (F);
(II) pouring the admixed composition into a suitable mold wherein said composition expands and solidifies to a foam having the aforesaid density; and
(III) subsequently demolding the resultant foamed article from the mold.

Suitable polyols which can be employed as component (A) include those prepared by reacting an initiator which is preferably essentially free of polymerizable unsaturated groups and having from 2 to about 8 active hydrogens with a vicinal epoxy compounds. The polyols should also be free of nitrogen atoms within the chemical structure of the polyol. This does not mean however that the polyols are free from dissolved nitrogen molecules.

Suitable initiator compounds include water, ethylene glycol, propylene, glycol, glycerine, trimethylolpropane, pentaerythritol, dibromoneopentyl glycol, sorbitol, sucrose, hydroquinone, resorcinol, catechol, bisphenols, novolac resins, mixtures thereof and the like.

Suitable vicinal epoxy compounds include, for example, ethylene oxide, 1,2-propylene oxide, 1,2-butylene oxide, 2,3-butylene oxide, epichlorohydrin, epibromohydrin, styrene oxide, butyl glycidyl ether, phenyl glycidyl ether, mixtures thereof and the like.

Also suitable is a class of polyols known as polytetramethylene glycols which can be prepared by the polymerization of tetrahydrofuran.

Suitable polyisocyanates which can be employed as component (B) in the present invention include, for example, any organic polyisocyanate preferably essentially free of polymerizable unsaturated groups having 2 or more NCO groups per molecule and no other substituents capable of reacting with the polyol. Suitable such polyisocyanates include aromatic, aliphatic and cycloaliphatic polyisocyanates such as, for example, 2,4-toluene diisocyanate, 2,6-toluene diisocyanate, hexamethylene diisocyanate, p,p'-diphenyl methane diisocyanate, p-phenylene diisocyanate, hydrogenated methylene diphenyl diisocyanate (e.g. Hylene ® W), isophorone diisocyanate, naphthalene diisocyanate, dianisidine diisocyanate, polymethylene polyphenol isocyanate, mixtures of one or more polyisocyanates and the like.

Other organic isocyanates which may suitably be employed and which are to be included in the term "organic polyisocyanate" include isocyanate terminated prepolymers prepared from the previously mentioned polyols and isocyanates.

Solid polyisocyanates are more conveniently employed by dissolving them in one of the components being employed, for example, methylene diphenyl diisocyanate can be dissolved in styrene, or bitolylene diisocyanate may be dissolved in tolylene diisocyanate.

The liquid vinyl monomer or blend of monomers should preferably have an atmospheric boiling point above about 70° C and more preferably an atmospheric boiling point above about 100° C. A vinyl monomer having an atmospheric boiling point below 70° C when blended into a composite forming formulation tends to exhibit the presence of gas cells in the cured polymer (which may not be desirable) and, further, composites containing these low boiling vinyl monomers tend to exhibit undesirably high vapor losses during the polymerization processes.

Suitable monomers which can be employed as component (C) include, for example, styrene, divinylbenzene, 2-ethylhexylacrylate, butylacrylate, tertiarybutyl styrene, trimethylolpropane trimethacrylate, 1,3-butylene glycol dimethacrylate, vinyl toluene, chlorostyrene, methyl methacrylate and vinyl benzylchloride.

Other suitable monomers include butyl methacrylate, indene, vinyl naphthalene (m.p.=60-62° C), vinyl cyclohexane, vinyl benzoate, vinyl acetate, and vinyl sulfone.

The monomer concentration in the formulation can range from at least about 15 wt. % to about 75 wt. %, preferably from about 20% to about 60% by weight based on the combined weight of components (A), (B), (C), (D) and (E). No significant contribution of the vinyl monomer can usually be observed in formulations containing substantially less than about 15 wt. % of the vinyl compound.

Generally, liquid (at room temperature) monomers are preferred, but solid (at room temperature) monomers can also be used if they are dissolved in another monomer or polyol or liquid modifier substance or polyisocyanate to yield a fluid mixture. As an example, vinyl naphthalene can be dissolved in styrene monomer.

The present invention requires the use of two types of catalyst, namely a catalyst for urethane formation and a catalyst for the polymerization of ethylenically unsaturated monomers.

The critical urethane catalyst required for the formation of the described vinyl-urethane composites, as has been mentioned previously, is a cobalt compound or cobalt-like compound selected from the group of vanadium or copper compounds. The most preferred catalysts are the cobalt compounds and the least preferred is the vanadium compounds. These catalysts serve a double purpose of effecting the urethane formation and effect the cure of the vinyl component. Examples of cobalt compounds useful as catalysts in these polymerizing reactions include the commercially available cobalt naphthanate (containing 6% or 12% Co by weight), cobalt octoate, cobalt acetate dissolved in a 400 molecular weight poly oxyethylene glycol, $CoCl_2 \cdot 6H_2O$ dissolved in the same glycol to obtain a 6 weight percent Co solution, $Co \cdot (NO_3)_2 \cdot 6H_2O$ dissolved in a glycol, or a cobalt chelate such as cobalt dimethyl glyoxime dissolved in an appropriate glycol. Generally, the cobalt carboxylates (naphthenates, octoates, acetates, etc.) effect a more rapid overall cure of the composites compared to the use of inorganic cobalt salts dissolved in a glycol. Cobalt compounds may be used as the sole urethane forming catalyst in the formation of these polymeric composites, however, if more rapid curing is desired (particularly when using polyols containing secondary hydroxyls) then a supplemental urethane forming catalyst may be employed.

Vanadium compounds are also effective in catalyzing the urethane reaction and promoting the vinyl polymerization at generally slower rates than the cobalt compounds. Examples of vanadium catalysts include vanadium neo-decanoate, vanadyl naphthenate, vanadium pentoxide dissolved in such glycols as tripropylene glycol, or $VCl_3$ or $VOCl_2$ dissolved in a glycol. Copper compounds such as, for example, copper octoate, copper napthanate, copper oleate can also catalyze the urethane reaction and promote the vinyl polymerization. However, due to the generally weaker overall catalytic effect, the vanadium type catalysts are less preferred than the cobalt or copper type catalysts.

The catalysts described for use in the formation of the vinyl/urethane composites are admixed with the reactants in a concentration range of about 4 wt. % down to about 0.05 wt. %. The preferable range is from about 0.2 wt. % to about 2 wt. % of the total formulation. The catalyst concentrations here refer to mass fractions of the commercially available compounds rather than the mass fraction of the heavy metal alone. In order words, one half of 12% Co Napthenate is used to replace a 6% Co Naphthenate in a formulation. The overall cure time of these composites is generally inversely proportional to the heavy metal catalyst concentrations.

Suitable supplemental catalysts for urethane formation include, for example, organo metal compounds, and alkali metal alkoxides.

Suitable organo-metal catalysts for urethane formation include, for example, organo-metal compounds of tin, zinc, lead, mercury, cadmium, bismuth, antimony, iron, manganese, and the like such as, for example, metal salts of a carboxylic acid having from about 2 to about 20 carbon atoms including, for example, stannous octoate, dibutyltin dilaurate, dibutyltin diacetate, ferric acetyl acetonate, lead octoate, lead oleate, phenylmercuric propionate, lead naphthenate, manganese naphthenate, zinc octoate antimony octoate, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Amine catalysts cannot be employed as the catalyst for urethane formation or even as a supplemental catalyst in combination with the cobalt or cobalt-like catalysts for urethane formation.

Preferably, these urethane catalysts are in liquid form, but if they are inherently a solid at room temperature then they may be dissolved in an appropriate liquid having a boiling point above about 150° C, such as, for example, dipropylene glycol.

Suitable catalysts for polymerization of the ethylenically unsaturated monomers include, "free radical" type catalysts or "initiators" such as, for example, tertiarybutyl perbenzoate, tertiarybutyl peracetate, 2,5-dimethyl hexane diperoxy-2-ethyl hexoate, bis(4-tertiarybutyl cyclohexyl)peroxydicarbonate, tertiarybutylperoxy isopropyl carbonate, azobisisobutyronitrile and 2,2'-azobis(2,4-dimethylvaleronitrile).

Other suitable vinyl catalysts include, for example, benzoyl peroxide, methyl ethyl ketone peroxide, cumene hydroperoxide or tert. butyl peroxypivalate, but generally since they can yield composite resin castings that usually yield higher hardness or stiffness or yield a more desirable color in the cast resin.

The effective quantity of vinyl catalyst (or initiator) is usually from at least about 0.05 wt. % to about 5 wt. % (based on the combined weight of components (A), (B), (C), (D) and (E)). Preferably, the vinyl catalyst concentration is from about 0.1 wt. % to about 1 wt. %.

Experimental evidence suggests that formulations based on polyols containing secondary hydroxyls may require a higher concentration of the vinyl initiator than formulations based on polyols containing primary hydroxyls.

The total concentration of both the heavy metal urethane catalyst and the free radical initiator catalyst and especially the weight ratio of heavy metal urethane catalyst to the vinyl initiator not only affect the cure rate of the resultant composite but also affect the overall physical properties of the composite. The trends or direction of the change in resultant physical properties may be strongly affected by the polyol portion of the formulation. For example, in a formulation of about 50 wt. % styrene, a 300 molecular weight glycol, a polymethylene polyphenyl isocyanate, catalyzed by about 0.25 wt. % of cobalt naphthenate, and decreasing the vinyl initiator concentration from about 1 wt. % to about 0.01 wt. % yielded a series of composites that ranged from a highly extensible elastomer at high vinyl initiator concentrations to a relatively high modulus composite showing a greatly decreased elongation at a greatly increased tensile strength at very low vinyl initiator concentration.

The critical requirement, if there be one, for the vinyl catalyst concentration is that sufficient catalyst be present to prevent a vinyl monomer plasticized urethane resin as the resulting product rather than the desired composite of a vinyl polymer and a urethane polymer.

The time required for the onset of gellation or solidification of the reactive blend is dependent on the catalyst composition and concentration and is also dependent on the average equivalent weight of the polyol portion of the formulation (lower average equivalent polyols result in faster gellation or solidification at identical catalyst compositions and concentrations) and also on the concentration of the vinyl monomer fraction in the formulation (lower vinyl monomer concentrations generally tend to yield more rapid solidification).

Suitable optional solid or liquid modifier substances which may be employed as component (F) include those described in U.S. Pat. No. 3,773,697 and so much thereof as pertains to suitable modifier substances are incorporated herein by reference.

Also included herein as suitable solid modifiers are the woven or mat materials wherein the individual fibers from which such materials are prepared have a surface area of less than 0.8 m$^2$/gram and which will pass through a one-fourth inch square opening.

Suitable low boiling liquids which can be employed herein as component (G-1-a) include for example methylene chloride, trichloromonofluoromethane, 1,2-dibromotetrafluoroethane, 1,1,1-trichlorotrifluoroethane, acetone, 1,1,1-trichloroethane, mixtures thereof and the like.

Suitable substances which decompose thermally to release $CO_2$ or water vapor at the reaction temperature which can be employed herein as component (G-1-b) include, for example, $MgSO_4.7H_2O$, $Na_2CO_3.10H_2O$, $Na_3PO_4.12H_2O$, $Ca(NO_2)_2.4H_2O$, $(NH_4)_2CO_3.H_2O$, $NH_4HCO_3$, mixtures thereof and the like.

Suitable solid particulate substances which can be employed herein as component (G-1-c) include, for example, those described in U.S. Pat. No. 3,753,933, incorporated herein by reference.

Suitable cell control agents which can be employed herein as component (G-2) include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520 and L-5320 commercially available from Union Carbide Corp. and the like.

The shaping or forming of these polymer-forming and urethane-forming ingredients into non-elastomeric composite articles may be accomplished by pouring the reactive mixture into molds made of substances such as, for example, polyethylene, polypropylene or polyethylene terephthalate such as Mylar ®, silicone elastomers, or metals such as aluminum, copper or alloys such as brass or stainless steel. The critical requirements of the mold are that it can withstand the exotherm of the polymerizing mass and be non-reactive or insoluble in contact with the liquid charge. To prevent the solidifying mass from adhering to the mold surface, it may be necessary to precoat the mold surface with a film of a hydrocarbon wax or a polysiloxane preparation or a polytetrafluoroethylene coating, or employ an internal mold release agent in the composition.

When pouring a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effective on relatively large cross section castings and thus, these thin wall metal molds may not require preheating.

Generally, the thickness of the castings obtainable by the process of the present invention can be dependent on these factors:

(A) boiling point of the vinyl monomer
(B) equivalent weight of the polyol and polyisocyanate components
(C) catalyst concentration.

Low boiling vinyl compounds (say 100° C to 150° C) are useful for casting having a thickness of from about ⅛-inch to about ½-inch. Swelling or cracking of the casting may be experienced when using low boiling vinyl compounds for casting thicknesses from about one inch to several inches. Higher boiling vinyl compounds (say 150° to 250° C or above) are preferred for casting these thick products.

The following examples are illustrative of the present invention, but are not to be construed as being limited thereto.

In the following Examples and Comparative Experiments, unless otherwise noted, all of the components (except the catalyst for urethane formation) were thoroughly blended together after which said catalyst was added and admixed therewith.

EXAMPLE 1

Rapid curing elastomeric composite employing a diol and a polyisocyanate having a functionality greater than 2.5.

Blended the following:
50 grams of styrene
50 grams of a 300 mol. wt. polyoxyethylene glycol
45 grams of a polymeric polyphenyl isocyanate (133 NCO eq. wt.; average functionality of about 2.7)
1 cc of tert. butyl perbenzoate
0.5 gram of cobalt naphthenate (6% Co) This blend was cast in a Mylar ® tray and solidification was observed to occur within 3 minutes after the addition of the cobalt catalyst. After the cast elastomeric sheet had cooled to room temperature, the Shore D hardness was found to be 55 units. This relatively low resilient elastomer exhibited a tensile strength of about 3068 psi (215.68 kg/cm$^2$) at an elongation of 270 percent.

EXAMPLE 2

Similar to Example 1 employing a 600 mol. wt. glycol.

Blended the following:
75 grams of styrene
50 grams of a 600 mol. wt. polyoxyethylene glycol
25 grams of polymethylene polyphenyl isocyanate (133 NCO eq. wt.; average functionality of about 2.7)
0.5 cc of tert. butyl perbenzoate
0.5 grams of Co Naphthenate (6% Co)
0.4 cc of Pb Octoate (24% Pb) Cast this blend into a Mylar ® tray and observed that gellation occurred in about 120 seconds after the addition of the Co and Pb catalysts. This cured elastomeric composite was found to exhibit a tensile strength of 2456 psi (172.66 kg/cm$^2$) at an elongation of 410 percent.

EXAMPLE 3

Similar to Example 1 employing a 1500 mol. wt. polyoxyethylene glycol
Blended the following:
100 grams of styrene
100 grams of a 1500 mol. wt. polyoxyethylene glycol
20 grams of polymethylene polyphenyl isocyanate (133 NCO eq. wt.; average functionality of about 2.7)
1 cc of tert. butyl perbenzoate
0.5 gram of CoNaphthenate (6% Co) Cast this blend into a Mylar ® tray. In the absence of any oven baking of this casting, the elastomeric composite was found to have a cured tensile strength of 1941 psi (136.45 kg/cm$^2$) at an elongation of 350 percent.

EXAMPLE 4

Similar to Example 1 employing a 4000 mol. wt. polyoxyethylene glycol
Blended the following:
200 grams of styrene
100 grams of a 4000 mol. wt. polyoxyethylene glycol
10 grams of poly methylene polyphenyl isocyanate (133 NCO eq. wt.; an average functionality of about 2.7)
1 cc of tert. butyl perbenzoate
1 gram of Co Naphthenate (6% Co)
1 cc of Pb Octoate (24% Pb) This blend was cast into a Mylar ® tray to yield a sheet casting having an exposed surface area of about 54 square inches. This casting appeared to have cured within 5½ hours at room temperature but this elastomeric composite was not removed from the tray mold until 7 hours after pouring. This casting exhibited a weight loss of about 32 grams, presumably styrene evaporation during the cure interval.

EXAMPLE 5

Variation in composite properties as a function of vinyl catalyst concentration in the formulation
Blended the following:
100 grams of styrene
40 grams of 300 mol. wt. polyoxyethylene glycol
50 grams polymethylene polyphenyl isocyanate (133 NCO eq. wt.; average functionality of about 2.7)
0.5 cc of Co Naphthenate (6% Co) amount of tert. butyl perbenzoate as shown in Table I Each of these blends was cast into a Mylar ® tray and were allowed to cure in the absence of any added heat. Those castings containing the higher concentrations of tert. butyl perbenzoate were demolded in about 15 minutes after casting, whereas those with the lesser concentration of the vinyl initiator, were demolded in about an hour after casting. Properties of the polymeric composites are shown in the following Table I.

TABLE I

| ccs of t-butyl perbenzoate added | Average Shore D Hardness | Tensile Strength | Elongation |
|---|---|---|---|
| 2 | 82 | 1631 psi (114.66 kg/cm$^2$) | 186% |
| 0.5 | 50 | 1055 psi (74.17 kg/cm$^2$) | 360% |
| 0.05 | 65 | 5636 psi (396.21 kg/cm$^2$) | 83% |
| 0.02 | 65 | 4758 psi (334.49 kg/cm$^2$) | 54% |

EXAMPLE 6

A variation of Example 5 in which the vinyl initiator is held at a constant concentration and the cobalt catalyst concentration is varied.
Blended the following:
100 grams of styrene
50 grams of 300 mol. wt. polyoxyethylene glycol
50 grams of polymethylene polyphenyl isocyanate (133 NCO eq. wt.; average functionality of about 2.7)
1 cc of tert. butyl perbenzoate
amount of cobalt naphthenate (6% Co) indicated in Table II below. Each of these blends were cast into Mylar ® trays. Each casting was allowed to cure in the absence of any added heat. Formulations containing the highest Co catalyst concentrations were demolded within 15 minutes of catalyst addition and the casting containing the lowest Co concentration were allowed to cure at room temperature and were demolded in about 20 hours after casting.

TABLE II

| Cobalt Catalyst Concentration | Gellation Time | Tensile Strength | Elongation |
|---|---|---|---|
| 1% | 75 sec. | 1631 psi (114.66 kg/cm$^2$) | 186% |
| 0.5% | 120 sec. | 1603 psi (112.69 kg/cm$^2$) | 232% |
| 0.25% | 210 sec. | 3286 psi (231.01 kg/cm$^2$) | 60% |
| 0.125% | >3600 sec. | 4095 psi (287.88 kg/cm$^2$) | 84% |

EXAMPLE 7

Effect of various cobalt and vanadium catalysts on the properties of vinyl-urethane composites
Blended the following:
100 grams of styrene
50 grams of 300 mol. wt. polyoxyethylene glycol
50 grams of polymethylene polyphenyl isocyanate (133 NCO eq. wt.; average functionality of about 2.7)
1 cc of tert. butyl perbenzoate
metal catalyst indicated in Table III Each of the blends were cast into a Mylar ® tray. Each casting was allowed to cure in the absence of any added heat.

TABLE III

| Catalyst | Amount | Approximate Cure Time at Ambient Temp. (about 25° C) | Tensile Strength | Elongation |
|---|---|---|---|---|
| Cobalt Naphthenate (6% Co) | 1 cc | Less than 15 min. | 1603 psi (112.69 kg/cm$^2$) | 232% |
| Co$^{II}$ (Dimethyl Glyoxime)$_2$ 2% Co in E-400 glycol$^1$ | 2 cc | Less than 28 hours | 1925 psi (135.33 kg/cm$^2$) | 174% |
| CoCl$_2$ . 6H$_2$O 6% Co in E-400 glycol | 2 cc | About 20 hours | 4221 psi (296.74 kg/cm$^2$) | 52% |
| Co(NO$_3$)$_2$ . 6H$_2$O | 1 cc | Less than 48 hours | 7115 psi | 38% |

TABLE III-continued

| Catalyst | Amount | Approximate Cure Time at Ambient Temp. (about 25° C) | Tensile Strength | Elongation |
|---|---|---|---|---|
| 6% Co in E-400 glycol Co Acetate . 4H$_2$O | 1 cc | Less than 24 min. | (500.18 kg/cm$^2$) 3167 psi | 78% |
| 6% Co in E-400 glycol [Co$^{III}$(NH$_3$)$_4$CO$_3$]NO$_3$ Less than 6% Co in E-400 glycol | 2 cc | More than 48 hours | (222.64 kg/cm$^2$) 2941 psi (206.75 kg/cm$^2$) | 220% |
| 1% V$_2$O$_5$ in E-200 glycol$^2$ | 2½ cc | About 20 hours | 3000 psi (210.9 kg/cm$^2$) | 153% |
| 1% VCl$_3$ in E-200 glycol | 2 cc | Less than 72 hours | 4831 psi (339.62 kg/cm$^2$) | 77% |
| 6% VOCl$_2$ in E-200 glycol | 2 cc | Less than 72 hours | 2761 psi (194.1 kg/cm$^2$) | 175% |

$^1$E-400 glycol is a 400 molecular weight polyoxyethylene glycol
$^2$E-200 glycol is a 200 molecular weight polyoxyethylene glycol.

EXAMPLE 8

Elastomeric composite obtained from the reaction of a diisocyanate, a triol, and styrene.
Blended the following:
80 grams of styrene
80 grams of a 700 mol. wt. triol (adduct of propylene oxide and glycerine)
30 grams of 80/20 2,4-/2,6-toluene diisocyanate
1 cc tert. butyl perbenzoate
1 cc of a 50/50 wt. % blend of Pb Octoate (24% Pb) and Co Naphthenate (6% Co) This blend was cast into a Mylar ® tray and allowed to cure at room temperature in the absence of any added heat. The cured elastomeric composite was found to exhibit a Shore D hardness of 80 units and a tensile strength of 2127 psi (149.53 kg/cm$^2$) at an elongation of 250 percent.

EXAMPLE 9

Reaction of a 400 mol. wt. diol based on propylene oxide, an isocyanate having a functionality greater than 2.5 and styrene
Blended the following:
75 grams of styrene
75 grams of 400 mol. wt. polyoxypropylene glycol
50 grams of polymethylene polyphenyl isocyanate (133 NCO eq. wt.; average functionality of about 2.7)
1 cc tert. butyl perbenzoate
2 cc of a 50/50 wt. % blend of Pb Octoate (24% Pb) and Co Naphthenate (6% Co) Cast this blend into a Mylar ® tray. This blend gelled in about 60 seconds after addition of the metal catalyst. Casting was found demoldable in less than 15 minutes after catalyst addition. This composite was found to exhibit a tensile strength of 1164 psi (81.83 kg/cm$^2$) at an elongation of 284 percent.

EXAMPLE 10

Similar to Example 9 except that a 1000 mol. wt. diol based on propylene oxide was employed.
Blended the following:
80 grams of styrene
100 grams of a 1000 mol. wt. polyoxypropylene glycol
30 cc of polymethylene polyphenyl isocyanate (133 eq. wt.; average functionality of about 2.7)
1 cc of tert. butyl perbenzoate
2 cc of a 50/50 wt. % blend of Pb Octoate and Co Naphthenate (6% Co) Cast this blend into a Mylar ® tray. Demolded elastomeric sheet casting about 24 hours after casting and curing at room temperature. This composite was found to exhibit a tensile strength of 1057 psi (74.24 kg/cm$^2$) at an elongation of 434 percent.

EXAMPLE 11

Vinyl urethane composite based on a blend of high equivalent weight and low equivalent weight polyols.
Blended the following:
50 grams of styrene
40 grams of a 4700 mol. wt. adduct of glycerine and propylene oxide containing 16% by weight of an ethylene oxide end-cap
10 grams of diethylene glycol
20 grams of 80/20 2,4-/2,6-toluene diisocyanate
1 cc of tert. butyl perbenzoate
1 gram of Co Naphthenate (6% Co)
1 cc of Pb Octoate (24% Pb) This blend was cast into a Mylar ® tray. Slow gellation was observed to occur between the 8th and 12th minute after addition of the metal catalysts. Curing of this opaque elastomeric composite occurred at ambient temperature. The cured product exhibited a tensile strength of 1613 psi (113.39 kg/cm$^2$) at an elongation of 770 percent.

EXAMPLE 12

Vinyl urethane composite based on a blend of high equivalent weight and low equivalent weight polyols.
Blended the following:
30 grams of styrene
32 grams of a 2000 mol. wt. Polyoxypropylene glycol
23 grams of dipropylene glycol
50 grams of polymethylene polyphenyl isocyanate (133 NCO eq. wt.; average functionality of about 2.7)
1 cc of tert. butyl perbenzoate
0.5 gram of Co Naphthenate (6% Co)
0.7 cc of Pb Octoate (24% Pb) Cast this blend into a Mylar ® tray. Sudden gellation was observed to occur in less than 30 seconds after addition of the Pb Octoate catalyst. About 60 seconds later, the casting turned opaque and exhibited a maximum polymerization exotherm of about 130° C. After the casting had cooled, it exhibited a tensile strength of 1419 psi (99.76 kg/cm$^2$) at an elongation of 152 percent.

EXAMPLE 13

Comparison of properties of a formulation described below in the presence and absence of styrene. Blends cast into Mylar ® trays.
Formulation
50 grams 4700 MW polyol of Example 11

50 grams polymethylene polyphenyl isocyanate (133 eq. wt. a and average functionality of about 2.7)
18 grams diethylene glycol
0.5 cc Co Naphthenate
1 cc Pb Octoate
Styrene as indicated
1 cc t-butyl perbenzoate (with styrene)

| Property | 0% Styrene (comparative) | 29.8% Styrene |
|---|---|---|
| Tensile Strength | 345 psi (24.25 kg/cm²) | 1709 psi (120.14 kg/cm²) |
| Elongation | 125% | 174% |

EXAMPLE 14

Another comparison of properties as a function of styrene concentration in the reactive blends. Formulations shown below cast in Mylar ® trays. Tensile and elongation shown for each styrene content.
Formulation
100 grams polyol of Example 2
50 grams polymethylene polyphenyl isocyanate (133 eq. wt. and average functionality of about 2.7)
1 cc Pb Octoate (24% Pb)
1 cc Co Naphthenate (6% Co)
Styrene, as indicated wt. %
1 cc T-butyl perbenzoate

| Property | 0% Styrene Comparative | 25% Styrene | 40% Styrene | 50% Styrene |
|---|---|---|---|---|
| Tensile Strength | 307 psi (21.58 kg/cm²) | 645 psi (45.34 kg/cm²) | 1368 psi (96.16 kg/cm²) | 2574 psi (108.95 kg/cm²) |
| Elongation | 90% | 150% | 250% | 216% |

EXAMPLE 15

Still another comparison of properties as a function of styrene concentration in the reactive blend. Formulations shown below cast into Mylar ® trays. Tensile strength, percent elongation, and Shore A hardness shown for each styrene content.
Formulation
80 grams adduct of glycerine and propylene oxide having an equivalent weight of about 233
30 grams 80/20 2,4-/2,6-toluene diisocyanate
1 cc Pb Octoate (24% Pb)
1 cc Co Naphthenate (6% Co)
Styrene as indicated in wt. %
1 cc t-butyl percenboate

| Property | 26.6% Sty. | 47.6% Sty. | 58% Sty. |
|---|---|---|---|
| Tensile Strength | 928 psi (65.24 kg/cm²) | 1567 psi (110.16 kg/cm²) | 2155 psi (151.5 kg/cm²) |
| Elongation | 179% | 250% | 212% |
| Shore A Hardness | 75 | 85 | 95 |

EXAMPLE 16

Combination catalyst of $V_2O_5$ in a 300 MW polyoxyethylene glycol (1% V) pulse PbOctate (24% Pb) in a vinyl urethane composite.
Blended the following:
100 grams of styrene
50 grams of a 300 MW polyoxyalkylene glycol
50 grams PAPI isocyanate (133 NCO eq. wt.; average functionality of about 2.7).
1 cc tert. butyl perbenzoate
2-½ ccs of $V_2O_5$ in a 300 MW polyoxyethylene glycol (1 wt. % vanadium) Cast this blend into a Mylar ® tray; observed that gellation occurred in about 25 seconds after addition of the heavy metal catalysts. Polymerization exotherm reached a temperature of 75° C in less than 3 minutes. The composite sheet was removed from the mold in less than 3-½ minutes after the catalyst addition. This highly flexible sheet continued to remain in this condition for at least 2 days (sheet continued to cure at ambient conditions). By the 6th day, the sheet reached a tough, apparently stable state. The tensile strength of this composite, measured after the 6th day, was found to be 2856 psi (200.78 kg/cm²) at an elongation of 243 percent.

EXAMPLE 17

Composites utilizing vinyl toluene as the vinyl monomer
Blended the following:
80 grams of vinyl toluene
80 grams of 700 mol. wt. adduct of glycerine and propylene oxide
30 grams of 80/20 2,4-/2,6-toluene diisocyanate (TDI)
1 cc of tert. butyl perbenzoate
1 cc of 50/50 wt. % blend of Co Naphthenate (6% Co) and Pb Octoate (24% Pb) This blend was cast into a Mylar ® tray. Gellation was observed to occur about 90 seconds after addition of the CoPb catalyst blend. The polymerization exotherm reached a maximum temperature of 126° C in about 6 minutes after catalyst addition. The flexible transparent amber sheet was found to have a density greater than 1 g/cc, a Shore A hardness of 20 units, a tensile strength of 2159 psi (151.78 kg/cm²) at an elongation of 238 percent.

EXAMPLE 18

Use of a polytetramethylene glycol as the polyol.
Blended the following:
80 grams of styrene
80 grams of a 311 OH equivalent weight polytetramethylene glycol
40 grams of polymethylene polyphenyl isocyanate (133 NCO eq. wt.; an average functionality of about 2.7)
1 cc tert. butyl perbenzoate
1 cc Co Napthenate (6% Co)
1 cc of PbOctoate (24% Pb) Cast this blend into a Mylar ® tray. Observed that this liquid blend started to gel in about 15 minutes after catalyst addition. The casting exhibited an exotherm temperature (heat of polymerization) of about 49° C. In about 25 minutes after catalyst addition, the gelled blend exhibited a second exotherm yielding a cast temperature of about 92° C.

After this casting had cooled, the elastomeric composite exhibited a tensile strength of 1803 psi (126.75 kg/cm²) at an elongation of 225 percent.

EXAMPLE 19

Vinyl-urethane composite resulting from the use of a TDI based prepolymer having an average functionality of about 2.6.

Blended the following:
100 grams of styrene
50 grams of 300 mol. wt. polyoxyalkylene glycol
50 grams of isocyanate prepolymer that is the reaction product of an 87 OH equivalent weight triol that is an adduct of glycerine and propylene oxide and 80/20 2,4-/2,6-TDI. The prepolymer contained 30 wt. % NCO; had an NCO eq. wt. of about 138 and an average functionality of about 2.6.
1 cc of tert. butyl perbenzoate
1 cc of 50/50 wt. % blend of Co Naphthenate and Pb Octoate. This blend was cast into a Mylar ® tray and was observed to solidify between the 2nd and 3rd minute after catalyst addition. The reaction exotherm resulted in a casting temperature of about 70° C in 3 minutes after catalyst addition. A second exotherm was observed to occur between the 4th and 5th minute after catalyst addition resulting in a casting temperature of about 145° C. After this casting had cooled to room temperature, it was found to exhibit a tensile strength of 2246 psi (157.89 kg/cm²) at an elongation of 289 percent.

EXAMPLE 20

Preparation of a series of elastomeric vinyl urethane composites which were subsequently subjected to an alkaline hydrolysis to recover the filterable polystyrene fraction of the composite. The molecular weight of the polystyrene fraction was determind by gel permeation techniques.

Sample A

Blended the following:
100 grams of styrene
36 grams of diethylene glycol
100 grams of polymethylene polyphenyl isocyanate (133 NCO eq. wt. and an average functionality of about 2.6)
100 grams of the polyol of Example 11
1 cc of tert. butyl perbenzoate
0.5 cc of cobalt naphthenate (6% Co)
1 cc of lead octoate (24% Pb) Cast this blend into a Mylar ® tray and allowed this formulation to cure at ambient conditions.

Sample B

Blended the following:
100 grams of styrene
100 grams of 1500 mol. wt. polyoxyethylene glycol
20 grams of polymethylene polyphenyl isocyanate (133 NCO eq. wt. and an average functionality of about 2.7)
1 cc of tert. butyl perbenzoate
0.5 cc of Co Naphthenate (6% Co) Cast this blend into a Mylar ® tray and allowed this formulation to cure at ambient conditions.

Sample C

Blended the following
75 grams of styrene
50 grams of 600 mol. wt. polyoxyethylene glycol
25 grams of polymethylene polyphenyl isocyanate (133 NCO eq. wt. and an average functionality of about 2.7)
1 cc of tert. butyl perbenzoate
1 cc of Co Naphthenate (6% Co)
1 cc of Pb octoate (24% Pb) Cast this blend into a Mylar ® tray and allowed this formulation to cure at ambient conditions.

Sample D

Blended the following:
45 grams of styrene
80 grams of an adduct of glycerine and propylene oxide having an average hydroxyl eq. wt. of about 233
30 grams 80/20 2,4-/2,6-toluene diisocyanate
1 cc tert. butyl perbenzoate
0.5 cc Co Naphthenate (6% Co)
1 cc Pb Octoate (24% Pb) Cast this blend into a Mylar ® tray and allowed the cure process to proceed under ambient conditions.

A portion of each of the above four elastomeric composites was abraded by a coarse silicon carbide grinding wheel to obtain a relative coarse powder sample of each polymer sample.

About seven grams of each powdered sample was refluxed in about 100 grams of a 6 wt. % KOH in methanol solution for about 2-½ hours. The methanol solutions were then filtered and an insoluble powder was recovered and subsequently washed with water, then washed with methanol, and finally dried.

Next, the recovered powders were subjected to infrared analysis to confirm the presence of polystyrene.

Finally, the recovered powders were analyzed by gel permeation chromatography for determination of molecular weight of the polystyrene fraction.

Data on tensile strength, percent elongation, weight percent polystyrene in composite (theoretical and experimental) and the weight average molecular weight of the polystryene found in summarized in Table IV.

TABLE IV

| Sample Number | Tensile Strength | Percent Elongation | Wt. Percent polystyrene Theo. | Wt. Percent polystyrene Exp. | Polystyrene Wt. Avg. Mol. Wt. (GPC Method) |
|---|---|---|---|---|---|
| A | 2120 psi (149.04 kg/cm²) | 230% | 29.7 | 26.4 | 176,073 |
| B | 1941 psi (136.45 kg/cm²) | 350% | 45.5 | 47 | 486,970 |
| C | 2456 psi (172.66 kg/cm²) | 410% | 50 | 47 | 1,072,018 |
| D | 895 psi (62.92 kg/cm²) | 165% | 29 | 33.6 | 235,076 |

EXAMPLE 21

Comparison of several urethane type catalysts in a vinyl polymer polyurethane composite formulation.

To a blend of styrene (75 grams); 600 mol. wt. polyoxyethylene glycol (50 grams); a 133 eq. wt., 2.7 functional polymethylene polyphenyl isocyanate (25 grams); and 1 cc of tert. butyl perbenzoate, was added the following urethane type catalyst:
Sample A — 0.5 cc Cobalt Naphthenate (6% Co)
Sample B — 1 cc Cobalt Naphthenate (6% Co)

Sample C — 0.5 cc Co Naphthenate + 0.5 cc Pb Octoate

Comparative Experiment 1 — Stannous octoate (1 cc)

Comparative Experiment 2 — 2 grams zinc naphthenate (10% Zn)

Comparative Experiment 3 — 1 cc antimony octoate

Comparative Experiment 4 — 2 cc DABCO 33LV (33% triethylenediamine in dipropylene glycol)

Comparative Experiment 5 — 1 cc of tetramethyl guanadine Each of these formulations was poured into a Mylar ® tray to yield an approximately ¼-inch (0.64 cm) thick casting while curing under ambient conditions. After 1 week, these castings exhibited the following weight changes:

Sample A — (0.5 cc Co Nap) showed a weight loss of 4 grams

Sample B — (1 cc Coap) showed a weight loss of 0.1 grams

Sample C — (0.5 cc Co Nap + 0.5 cc Pb Oct) showed a wt. gain of 0.9 grams

Comparative Experiment 1 — ((Sn Oct) showed a weight loss of) 50.3 grams (67% loss based on styrene)

Comparative Experiment 2 — ((Zn Naph) showed a weight loss of) 48.0 grams (64% loss based on styrene)

Comparative Experiment 3 — ((Sb Oct) showed a weight loss of) 67.9 grams (90.5% loss based on styrene)

Comparative Experiment 4 — ((DABCO) showed a weight loss of) 44.9 grams (59.8% loss based on styrene)

Comparative Experiment 5 — ((tetramethylguanidine) showed a weight loss of) 41.2 grams (54.9% loss based on styrene)

The large weight losses of Comparative Experiments 1 thru 5 is presumed to result from the evaporation of styrene monomer. Furthermore, Comparative Experiments 1, 2, 4 and 5 were too weak to be removed from the Mylar ® mold after 1 week of curing at ambient conditions; removal resulted in tearing of the castings. Comparative Experiment 3 was barely removable from the Mylar ® tray. Samples A, B, C and Comparative Experiment 3 were found to exhibit the following properties:

|  | Tensile Strength | % Elong. | Shore D Hardness | Density |
|---|---|---|---|---|
| Sample A | 3000 psi (210.9 kg/cm²) | 327 | 60 | >1 g/cc |
| Sample B | 3209 psi (225.59 kg/cm²) | 371 | 50 | >1 g/cc |
| Sample C | 1911 psi (134.34 kg/cm²) | 303 | 55 | >1 g/cc |
| Comparative Experiment C | 159 psi (11.18 kg/cm²) | 173 | 35 | >1 g/cc |

EXAMPLE 22

A further comparison of urethane type catalysts.

To a blend of 75 grams styrene; 50 grams of a 600 mol. wt. polyoxyethylene glycol; 25 grams of a 133 eq. wt., 2.7 functionality polymethylene polyphenyl isocyanate and 1 cc of tert. butyl perbenzoate was added the following urethane type catalyst:

Sample A — 2 grams copper Naphthenate (6% Cu)

Comparative Experiment 1 — 2 grams of Zirconium Naphthenate (10% Zr)

Comparative Experiment 2 — 1 gram of potassium octoate

Comparative Experiment 3 — 1 gram of lead naphthenate (24% pb) Each of these catalyzed blends were poured into a Mylar ® tray and allowed to cure under ambient conditions.

Sample A was observed to be demoldable in about 30 minutes after addition of catalyst.

Comparative Experiment 1 could not be demolded after 3 days of ambient cure.

Comparative Experiment 2 was demolded in about 7 minutes after addition of urethane catalyst.

Comparative Experiment 3 was demolded in about 12 minutes after addition of urethane catalyst.

Properties of the demolded castings were found to be the following:

|  | Tensile Strength | % Elong. | Shore D Hardness | Density |
|---|---|---|---|---|
| Sample A | 2520 psi (177.16 kg/cm²) | 533 | 55 | >1 g/cc |
| Comparative Experiment 2 | 131 psi (9.21 kg/cm²) | 240 | 35 | >1 g/cc |
| Comparative Experiment 3 | 175 psi (12.3 kg/cm²) | 230 | 40 | >1 g/cc |

EXAMPLE 23

Comparison of several vinyl initiators in an elastomeric vinyl urethane composite.

To each of several blends containing 75 grams styrene; 50 grams of a polyoxyethylene glycol having an average mol. wt. of about 600; and 25 grams of polymethylene polyphenyl isocyanate having an NCO eq. wt. of about 133 and an average functionality of about 2.7 was added:

Sample A — 0.5 cc Co Naph + 0.5 cc PbOct + 1 g Benzoyl peroxide

Sample B — 0.5 cc Co Naph + 0.5 cc PbOct + 1 cc t-butyl hydroperoxide

Sample C — 0.5 cc Co Naph + 0.5 cc PbOct + 1 cc t-butyl peracetate Each of these formulations were cast into a Mylar ® tray and allowed to cure at ambient conditions. The cured elastomeric castings were found to exhibit the following properties:

|  | Tensile Strength | % Elong. | Shore D Hardness | Density |
|---|---|---|---|---|
| Sample A | 2156 psi (151.57 kg/cm²) | 630 | 50 | >1 g/cc |
| Sample B | 1866 psi (131.18 kg/cm²) | 540 | 55 | >1 g/cc |
| Sample C | 2176 psi (152.97 kg/cm²) | 490 | 50 | >1 g/cc |

EXAMPLE 24

Vinyl-urethane composite formed from an isocyanate prepolymer having a low concentration of isocyanate values.

Blended the following:

70 grams of styrene 10 grams of an adduct of glycerine and propylene oxide to an average OH eq. wt. of about 87

75 grams of a prepolymer prepared from an 80/20 mixture of 2,4-/2,6-toluene diisocyanate and a polyoxypropylene glycol having a mol. wt. of about 1000, said prepolymer having an NCO content of about 6% by weight and an NCO eq. wt. of about 700.

1 cc of tert. butyl perbenzoate 0.5 cc of Cobalt naphthenate (6% Co)

0.5 cc of Pb Octoate (24% Pb) Cast this blend into a Mylar ® tray and allowed the cure process to occur at room temperature. On the 3rd day after casting, the elastomeric composite was removed from the Mylar ® mold. This elastomeric polymer composite exhibited the following properties:

| Density | | >1 g/cc |
|---|---|---|
| Shore D Hardness | | ~50 |
| Tensile Strength | (die cut sample did not rupture within the testing machine) | greater than 1755 psi (123.38 kg/cm$^2$) |
| Elongation | | greater than 1100% |

EXAMPLE 25

Vinyl urethane composites employing various co-catalysts for urethane formation with cobalt naphthenate.

To a blend of styrene (80 grams); an adduct of glycerine and propylene oxide havng an OH equivalent weight of about 87 (80 grams); an 80/20 mixture of 2,4-/2,6-toluene diisocyanate (25 grams) and 1 cc of tert. butyl perbenzoate was added the following:

Sample A — 0.5 cc CO Naphthenate (6% Co) + 0.5 cc Pb Octoate (24% Pb)

Comparative Experiment 1 — 0.5 cc Co Naphthenate (6% Co) + 0.5 cc DABCO 33LV (33% diethylenetriamine in dipropylene glycol)

Comparative Experiment 2 — 0.5 cc Co Naphthenate (6% Co) + 0.5 cc tetramethyleneguanadine Each of these formulations was poured into a Mylar ® tray to provide an approximately 1/4-inch (0.64 cm) thick casting while curing under ambient conditions.

The weight loss was determined after 7 days as follows:

Sample A — 2 grams (2.5% based on styrene)

Comparative Experiment 1 — 47 grams (58.7% based on styrene)

Comparative Experiment 2 — 47.3 grams (59.1% based on styrene)

It is believed that the observed weight loss is attributed to evaporative loss of styrene monomer.

EXAMPLE 26

A comparative experiment demonstrating the inoperability of nitrogen-containing polyols.

Blended the following 60 grams of styrene 25 grams of the reaction product of aminoethylethanolamine with propylene oxide to an OH equivalent weight of about 70.

50 grams of an adduct of glycerine and propylene oxide subsequently end-capped with ethylene oxide, said adduct having an OH equivalent weight of about 1560 and containing about 16% ethylene oxide by weight 35 grams of an 80/20 mixture of 2,4-/2,6-toluene diisocyanate 1 cc of tert. butyl perbenzoate 1 cc of cobalt naphthenate (6% Co)

This blend was poured into a Mylar ® tray mold. After two days at ambient conditions, the casting had an observed weight loss of 39.7 grams (66.1% based on styrene).

In each of the foregoing examples, references of samples are for examples of the present invention whereas references to Comparative Experiments are for examples falling outside the scope of the present invention.

Also, in the foregoing examples, reference to ambient conditions refer to those conditions found in a laboratory, normally about 25°–27° C and atmospheric pressure.

I claim:

1. A process for preparing non-cellular polyurethane/vinyl polymer composite articles having a density of at least about 1 g/cc without the application of an external source of heat which process comprises:

(I) admixing the components of a composition comprising (A) a liquid polyol free of nitrogen atoms and substantially free of ethylenic unsaturation or mixtures of such polyols having from about 2 to about 8 hydroxyl groups and an average OH equivalent weight of at least about 30;

(B) an organic polyisocyanate which is substantially free of ethylenic unsaturation or a mixture of such polyisocyanates having an NCO equivalent weight of less than about 1000, with the proviso that when component (A) has an average of about 2 hydroxyl groups per molecule, said polyisocyanate has an average of at least about 2.5 NCO groups per molecule;

(C) from about 15% to less than about 75% by weight of the combined weight of Components (A), (B), (C), (D) and (E) of a polymerizable ethylenically unsaturated monomer having an atmospheric boiling point above about 70° C;

(D) an effective quantity of a suitable catalyst for polymerizing component (C);

(E) an effective quantity of a suitable catalyst for urethane formation selected from the compounds of the metals cobalt, copper, vanadium, and mixtures thereof; and (F) from 0 to about 50% by weight based upon the combined weight of Components (A), (B), (C), (D), (E) and (F) of a modifier substance free from groups reactive with components (A), (B) or (C) at the conditions employed herein, said modifier substances being selected from the group consisting of (1) liquid substances having an atmospheric boiling point of at least about 150° C;

(2) solid substances having a surface area of less than about 0.8 m$^2$/gram and a particle size such that said substance will pass through a one-fourth inch square opening, is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt index as determined with a 0.02-inch orifice employing a total weight of 2160 grams at 80° C of from about 1 to about 250 grams/minute;

(b) a solubility parameter of at least about 8; and
(c) a specific heat of at least about 0.35 calories/gram/° C; and
(4) mixtures thereof; and wherein components (A) and (B) are present in quantities such that the NCO:OH equivalent ratio is from about 0.70:1 to about 1.5:1 and with the following provisos:
(a) that the urethane exotherm temperature does not greatly exceed the boiling point of the monomer or mixtures of monomers employed as component (C);
(b) that the combined quantity of component (C) and (F) be less than about 60% by weight based upon the combined weight of components (A), (B), (C) and (F);
(c) that when Component (F-3) is employed as component (F), it is employed in quantities of 20% by weight of the combined quantities of components (A), (B) and (F);
(II) pouring the admixed composition into a suitable mold wherein said compositions solidifies to a solid having the aforesaid density; and
(III) subsequently demolding the resultant articles from the mold.

2. The process of claim 1 wherein Components (A) and (B) are present in quantities such that the NCO:OH ratio is from about 0.9:1 to about 1.2:1 and the average OH equivalent weight of Component (A) is from about 30 to about 2500 and the average equivalent weight of Component (B) is less than about 750 and wherein Component (C) is essentially free of groups reactive with Components (A) or (B), has an atmospheric boiling point above about 100° C and is present in quantities of from about 20% to about 60%.

3. The process of claim 2 wherein Component (A) has an average OH equivalent weight of from about 50 to about 1000.

4. The process of claim 3 wherein Component (E) is a compound of cobalt, copper or mixtures thereof.

5. The process of claim 4 wherein Component (E) is an organic compound of cobalt.

6. The process of claim 5 wherein Component (E) is selected from the group consisting of cobalt naphthenate, $Co^{II}$ (dimethyl glyoxime)$_2$, and cobalt acetate.4-$H_2O$.

7. The process of claim 4 wherein Component (E) is an inorganic compound of cobalt.

8. The process of claim 7 wherein Component (E) is selected from $CoCl_2.6H_2O$, $Co(NO_3)_2.6H_2O$ and $(Co^{III}(NH_3)_4CO_3)NO_3$.

9. The process of claim 4 wherein Component (E) is a copper compound.

10. The process of claim 9 wherein Component (E) is copper naphthenate.

11. The process of claim 3 wherein Component (E) is $V_2O_5$, $VCl_3$ or $VOCl_2$.

12. The process of claim 4 wherein Component (A) is an adduct of glycerine, trimethylolpropane, pentaerythritol, sucrose or mixtures thereof with propylene oxide, ethylene oxide or mixtures thereof.

13. The process of claim 12 wherein Component (A) is an adduct of glycerine with propylene oxide.

14. The process of claim 13 wherein Component (C) contains styrene.

15. Non-cellular polyurethane/vinyl polymer composite articles having a density of at least about 1 g/cc which results from the admixture without the application of an external source of heat of a composition which comprises:
(A) a liquid polyol free of nitrogen atoms and substantially free of ethylenic unsaturation or mixture of such polyols having from about 2 to about 8 hydroxyl groups and an average OH equivalent weight of at least about 30;
(B) an organic polyisocyanate which is essentially free of ethylenic unsaturation or a mixture of such polyisocyanates having an NCO equivalent weight of less than about 1000, with the proviso that when Component (A) has an average of about 2 hydroxyl groups per molecule, said polyisocyanate has an average of at least about 2.5 NCO groups per molecule;
(C) from about 15% to less than about 75% by weight of the combined weight of Components (A), (B), (C), (D) and (E) of a polymerizable ethylenically unsaturated monomer having an atmospheric boiling point above about 70° C of a mixture of such monomers;
(D) an effective quantity of a suitable catalyst for polymerizing Component (C);
(E) an effective quantity of a suitable catalyst for urethane formation selected from compounds of the metals cobalt, copper and vanadium; and
(F) from 0 to about 50% by weight based upon the combined weight of Components (A), (B), (C), (D), (E) and (F) of a modifier substance free from groups reactive with Components (A), (B) or (C) at the conditions employed herein, said modifier substances being selected from the group consisting of
(1) liquid substances having an atmospheric boiling point of at least about 150° C;
(2) solid substances having a surface area of less than about 0.8 m$^2$/gram and a particle size such that said substance will pass through a one-fourth inch square opening, is substantially free of any absorbed or occluded water and will not decompose at a temperature below the maximum exotherm temperature generated by the urethane forming reaction;
(3) polymers of one or more ethylenically unsaturated monomers, said polymers having
(a) a molecular weight such that the polymer has a grease melt index as determined with a 0.02-inch orifice employing a total weight of 2160 grams at 80° C, from about 1 to about 250 grams/minute, preferably from about 75 to about 2000 grams/minute;
(b) a solubility parameter of at least about 8 and preferably from about 8 to about 12.5;
(c) and a specific heat of at least about 0.35 calories/gram/° C; and
(4) mixtures thereof; and wherein Components (A) and (B) are present in quantities such that the NCO:OH equivalent ratio is from about 0.75:1 to about 1.5:1 and with the following provisos:
(a) that the urethane exotherm temperature does not greatly exceed the boiling point of the monomer employed as Component (C);
(b) that the combined quantity of Components (C) and (F) be less than about 65% by weight based upon the combined weight of Components (A), (B), (C) and (F);

(c) that when Component (F-3) is employed as Component (F), it is employed in quantities of about 20% by weight based upon the combined quantities of Components (A), (B) and (F).

16. The composite article of claim 15 wherein Components (A) and (B) are present in quantities such that the NCO:OH ratio is from about 0.9:1 to about 1.2:1 and the average OH equivalent weight of Component (A) is from about 30 to about 2500 and the average equivalent weight of Component (B) is less than about 750 and wherein Component (C) is essentially free of groups reactive with Components (A) or (B), has an atmospheric boiling point above about 100° C and is present in quantities of from about 20% to about 60%.

17. The composite article of claim 16 wherein Component (A) has an average OH equivalent weight of from about 50 to about 1000.

18. The composite article of claim 17 wherein Component (E) is a compound of cobalt, copper of mixtures thereof.

19. The composite article of claim 18 wherein Component (E) is an organic compound of cobalt.

20. The composite article of claim 19 wherein Component (E) is selected from the group consisting of cobalt naphthenate, $Co^{II}$ (dimethyl glyoxime)$_2$, and cobalt acetate.$4H_2O$.

21. The composite article of claim 18 wherein Component (E) is an inorganic compound of cobalt.

22. The composite article of claim 21 wherein Component (E) is selected from $CoCl_2.6H_2O$, $Co(NO_3)_2.6H_2O$ and $(Co^{III}(NH_3)_4CO_3)NO_3$.

23. The composite article of claim 18 wherein Component (E) is a copper compound.

24. The composite article of claim 23 wherein Component (E) is copper naphthenate.

25. The composite article of claim 17 wherein Component (E) is $V_2O_5$, $VCl_3$ or $VOCl_2$.

26. The composite article of claim 18 wherein Component (A) is an adduct of glycerine, trimethylolpropane, pentaerythritol, sucrose or mixtures thereof with propylene oxide, ethylene oxide or mixtures thereof.

27. The composite article of claim 26 wherein Component (A) is an adduct of glycerine with propylene oxide.

28. The composite article of claim 27 wherein Component (C) contains styrene.

29. Cellular polyurethane/vinyl polymer composites articles having substantially uniform cells, a density of less than 1 g/cc and which results without the application of an external source of heat after admixture of a composition which comprises (A) a liquid polyol free of nitrogen atoms and substantially free of ethylenic unsaturation or mixture of such polyols having from about 2 to about 8 hydroxyl groups and an average OH equivalent weight of at least about 30;

(B) an organic polyisocyanate which is substantially free of ethylenic unsaturation or a mixture of such polyisocyanates having an average NCO equivalent weight of less than about 300, with the proviso that when Component (A) has an average of about 2 hydroxyl groups per molecule, said polyisocyanate has an average of at least about 2.5 NCO groups per molecule;

(C) from about 15% to less than about 75% by weight of the combined weight of Components (A), (B), (C), (D) and (E) of a polymerizable ethylenically unsaturated monomer having an atmospheric boiling point above about 70° C or a mixture of such monomers;

(D) an effective quantity of a suitable catalyst for polymerizing Component (C);

(E) an effective quantity of a suitable catalyst for urethane formation selected from the compounds of the metals cobalt, copper and vanadium; and (F) from 0 to about 50% by weight based upon the combined weight of Components (A), (B), (C), (D), (E) or (F) of a modifier substance free from groups reactive with Components (A), (B) or (C) at the conditions employed herein, said modifier substances being selected from the group consisting of (1) liquid substances having an atmospheric boiling point of at least about 150° C;

(2) solid substances having a surface area of less than about 0.8 m$^2$/gram and a particle size such that said substance will pass through a ¼-inch square opening, is substantially free of any absorbed or occluded water and will not decompose at a temperature below the maximum exotherm temperature generated by the urethane forming reaction;

(3) polymers of one or more ethylenically unsaturated monomers, said polymers having (a) a molecular weight such that the polymer has a grease melt index as determined with a 0.02-inch orifice employing a total weight of 2160 grams/80° C of from about 1 to about 250 grams/minute;

(b) a solubility parameter of at least about 8; and (c) a specific heat of at least about 0.35 calories/gram/° C; and (4) mixtures thereof; and (G) a foam-forming system which comprises (1) a foaming agent selected from the group consisting of (a) low boiling vaporizable organic liquids having a boiling point below the reaction exotherm temperature;

(b) substances which decompose thermally to release $CO_2$ or release water vapor at the exotherm temperature;

(c) a solid particulate substance which will pass through a 2 mm square opening and which has a surface area of at least 0.8 m$^2$/gram;

(d) an inorganic metal hydrate characterized as having a solubility in anhydrous ethyl alcohol of less than about 1.2 grams per 100 grams and a weight loss of at least 5% when subjected to a temperature of 115° C for 30 minutes at atmospheric pressure;

(e) water; and (f) mixtures thereof; and (2) a cell control agent; and wherein Components (A) and (B) are present in quantities such that the NCO:OH equivalent ratio is from about 0.7:1 to about 1.5:1; Component (G-1) is present in quantities sufficient to provide the desired density and Component (G-2) is present in quantities sufficient to provide substantially uniform cells; and with the following provisos:

(a) that the urethane exotherm temperature does not greatly exceed the boiling point of the monomer or mixture of monomers employed as Component (C);
(b) that the combined quantity of Components (C) and (F) be less than about 60% by weight based upon the combined weight of Components (A), (B), (C) and (F);
(c) that when Component (G-1-c) or (G-1-d) is employed as the blowing agent, Component (G-2) is not required;
(d) that when Component (F-3) is employed as Component (F) it is employed in quantities to about 20% by weight based upon the combined weight of Components (A), (B) and (F).

30. The composite article of claim 29 wherein Components (A) and (B) are present in quantities such that the NCO:OH ratio is from about 0.9:1 to about 1.2:1 and the average equivalent weight of Component (A) is from about 30 to about 2500 and the equivalent weight of Component (B) is less than about 750 and wherein Component (C) is essentially free of groups reactive with Components (A) or (B), has an atmospheric boiling point above about 100° C and is present in quantities of from about 20% to about 60% and said composite has a density of from about 0.025 to about 0.8 g/cc.

31. The composite article of claim 30 wherein Component (A) has an average OH equivalent weight of from about 50 to about 1000.

32. The composite article of claim 31 wherein Component (E) is a compound of cobalt, copper or mixtures thereof.

33. The composite article of claim 32 wherein Component (E) is an organic compound of cobalt.

34. The composite article of claim 33 wherein Component (E) is selected from the group consisting of cobalt naphthenate, $Co^{II}$ (dimethyl glyoxime)$_2$, and cobalt acetate.4H$_2$O.

35. The composite article of claim 32 wherein Component (E) is an inorganic compound of cobalt.

36. The composite article of claim 35 wherein Component (E) is selected from $CoCl_2.6H_2O$, $Co(NO_3)_2.6H_2O$ and $(Co^{III}(NH_3)_4CO_3)NO_3$.

37. The composite article of claim 32 wherein Component (E) is a copper compound.

38. The composite article of claim 37 wherein Component is copper naphthenate.

39. The composite article of claim 31 wherein Component (E) is $V_2O_5$, $VCl_3$ or $VOCl_2$.

40. The composite article of claim 32 wherein Component (A) is an adduct of glycerine, trimethylolpropane, pentaerythritol, sucrose or mixtures thereof with propylene oxide, ethylene oxide or mixtures thereof.

41. The composite article of claim 40 wherein Component (A) is an adduct of glycerine with propylene oxide.

42. The composite article of claim 41 wherein Component (C) contains styrene.

43. A process for preparing cellular polyurethane/vinyl polymer composite articles having substantially uniform cells, a density of less than 1 g/cc which process comprises:
(I) admixing the components of a composition comprising
(A) a liquid polyol free of nitrogen atoms and essentially free of ethylenic unsaturation or mixture of such polyols having from about 2 to about 8 hydroxyl groups and an average OH equivalent weight of at least about 30;
(B) an organic polyisocyanate which is essentially free of ethylenic unsaturation or a mixture of such polyisocyanates having an NCO equivalent weight of less than about 300 with the proviso that when Component (A) has an average of about 2 hydroxyl groups per molecule, said polyisocyanate has an average of at least about 2.5 NCO groups per molecule;
(C) from about 15% to less than about 75% by weight of the combined weight of Components (A), (B), (C), (D) and (E) of a polymerizable ethylenically unsaturated monomer having an atmospheric boiling point above about 70° C or a mixture of such monomers;
(D) an effective quantity of a suitable catalyst of polymerizing Component (C);
(E) an effective quantity of a suitable catalyst for urethane formation selected from compounds of the metals cobalt, copper and vanadium; and
(F) from 0 to about 50% by weight based upon the combined weight of Components (A), (B), (C), (D), (E) and (F) of a modifier substance free from groups reactive with Components (A), (B) or (C) at the conditions employed herein, said modifier substances being selected from the group consisting of
(1) liquid substances having an atmospheric boiling point of at least about 150° C;
(2) solid substances having a surface area of less than about 0.8 m$^2$/gram and a particle size such that said substance will pass through a ¼-inch square opening, is substantially free of any absorbed or occluded water and will not decompose at a temperature below the maximum exotherm temperature generated by the urethane forming reaction;
(3) polymers of one or more ethylenically unsaturated monomers, said polymers having
(a) a molecular weight such that the polymer has a grease melt index as determined with a 0.02-inch orifice employing a total weight of 2160 grams at 80° C of from about 1 to about 250 grams/minute;
(b) a solubility parameter of at least about 8; and
(c) a specific heat of at least about 0.35 calories/gram/° C; and
(4) mixtures thereof; and
(G) a foam-forming system which comprises
(1) a foaming agent selected from the group consisting of
(a) low boiling vaporizable organic liquids having a boiling point below the reaction exotherm temperature;
(b) substances which decompose thermally to release $CO_2$ or release water vapor to the exotherm temperature;
(c) a solid particulate substance which will pass through a 2 mm square opening and which has a surface area of at least 0.8 m$^2$/gram;
(d) an inorganic metal hydrate characterized as having a solubility in anhydrous ethyl alcohol of less than about 1.2 grams per 100 grams and a weight loss of at least 5% when